H. R. BARBER.
Rubber-Belting.

No. 203,990.   Patented May 21, 1878.

Witnesses,
Thomas McIlvain
Harry Smith

Inventor,
Henry R. Barber
by his Attorneys
Howson and Son

UNITED STATES PATENT OFFICE.

HENRY R. BARBER, OF LAMBERTVILLE, NEW JERSEY.

IMPROVEMENT IN RUBBER BELTING.

Specification forming part of Letters Patent No. 203,990, dated May 21, 1878; application filed May 6, 1878.

*To all whom it may concern:*

Be it known that I, HENRY R. BARBER, of Lambertville, Hunterdon county, New Jersey, have invented a new and useful Improvement in the Manufacture of Rubber Belting, of which the following is a specification:

The object of my invention is to effect the secure junction of the edges of the outer covering of a rubber belt—an object which I attain in the following manner, reference being had to the accompanying drawing, in which—

Figure 1:
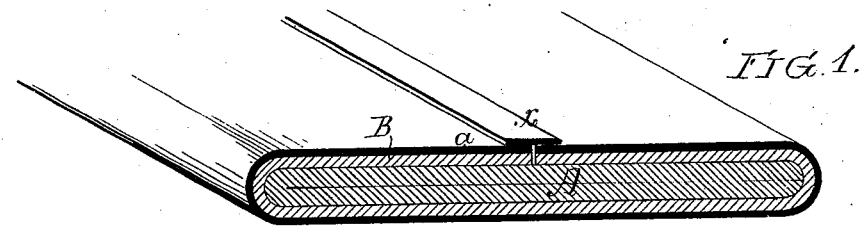
Figure 2:
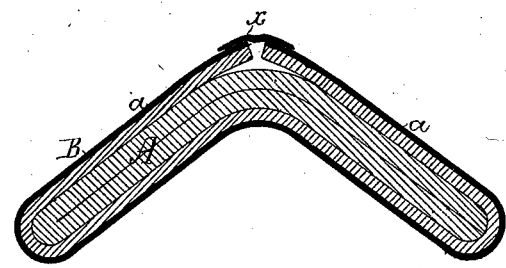
Figure 3:
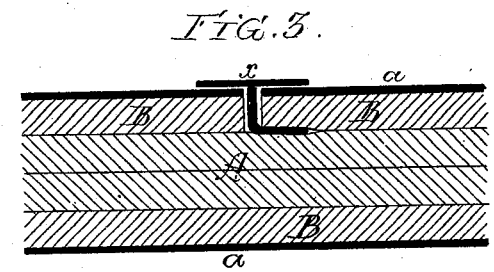

Figure 1 is a sectional perspective view, and Fig. 2 a transverse section, of a rubber belt, showing the ordinary method of making rubber belting and the objection thereto; and Figs. 3, 4, 5, 6, and 7, views illustrating different methods of carrying out my invention.

Rubber belting usually consists of a core, A, and an outer covering, B, the core comprising two or more layers of heavy textile fabric, generally cotton duck impregnated with rubber, and the outer covering B consisting of a strip, also impregnated with rubber, and having a facing, $a$, of the latter material, the edges of the strip abutting against each other at the center of the belt. Usually a strip, $x$, of comparatively thin rubber, is placed over this joint before the belt is vulcanized, the latter operation serving to effect the junction of the rubber facing $a$ of the covering B with the said strip $x$, which is thus relied upon to hold the edges of the covering B together.

While this is sufficient under some circumstances, any undue stretching of the outer covering—such, for instance, as would occur if the belt were bent as in Fig. 2—results in the separation of the edges of the covering, and a consequent impairment of the integrity of the belt.

This objection I overcome, in the manner shown in Figs. 3 to 7 of the drawing, by the use of a strip, $b$, of rubber interposed between the edges of the covering-strip of the belt, the strip $b$ being in all cases wide enough to overlap or underlap one or both of said edges, so as to facilitate its application and increase its hold upon the covering.

When a belt thus constructed is vulcanized, that portion of the strip which is between the edges of the covering-strip B firmly cements the said edges together, and effectually prevents their separation when a strain is exerted upon the covering.

Figure 4:
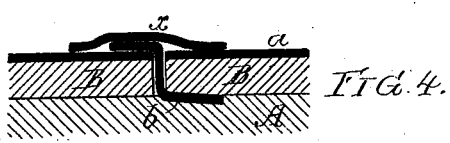
Figure 6:
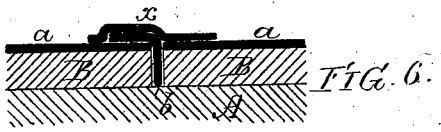
Figure 5:
Figure 7:
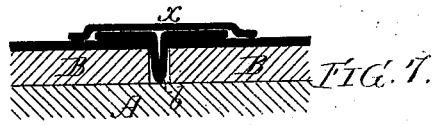

In the drawing I have shown different modes of carrying my invention into effect. Thus, in Fig. 3, the strip is wide enough to underlap one edge of the covering and to pass upward between the two edges. In Fig. 4 the strip underlaps one edge and overlaps the other. In Fig. 5 the strip is made to underlap both edges, and is double where it is interposed between the opposite edges. The manner of arranging the strip in Figs. 6 and 7 will be readily understood without explanation.

I prefer, in most cases, to use, in addition to the strip $b$, the usual strip $x$; but this is not absolutely necessary.

After the belt has been vulcanized there will be such an effective union of the edges of the covering that the joint cannot be disturbed by any strains to which the belt is likely to be subjected.

I claim as my invention—

1. The combination, in a rubber belt, of the outer covering B with a strip, $b$, of rubber interposed between the edges of said covering, and underlapping or overlapping one or both of said edges, all substantially as set forth.

2. The strip $b$, interposed between the opposite edges of the covering B of a rubber belt, and overlapping or underlapping one or both of the said edges, in combination with the strip $x$.

In testimony whereof I have signed my name to this specification in the presence of two subscribing witnesses.

HENRY R. BARBER.

Witnesses:
HARRY A. CRAWFORD.
HARRY SMITH.